United States Patent [19]
Boertlein

[11] Patent Number: 5,833,011
[45] Date of Patent: Nov. 10, 1998

[54] LANDSCAPING RAKE-LEVELING DEVICE

[76] Inventor: Robert Boertlein, 416 E. Eureka Ave., Eureka, Ill. 61530

[21] Appl. No.: 910,528

[22] Filed: Aug. 7, 1997

[51] Int. Cl.$^6$ ............................. E02F 5/32; A01B 13/08
[52] U.S. Cl. ...................... 172/149; 172/197; 172/445.1
[58] Field of Search ................................... 111/130, 149, 111/186, 121, 123, 924; 172/196, 197, 445.1, 169, 501, 548, 149

[56] References Cited

U.S. PATENT DOCUMENTS

| | | | |
|---|---|---|---|
| 3,448,814 | 6/1969 | Bentley et al. | 172/197 X |
| 3,709,303 | 1/1973 | Richards | 172/197 X |
| 4,217,962 | 8/1980 | Schaefer | 172/197 |
| 4,436,040 | 3/1984 | Chumley | 172/197 X |
| 4,729,435 | 3/1988 | Urich | 172/196 |
| 5,074,061 | 12/1991 | Thompson | 172/197 X |

*Primary Examiner*—Michael J. Carone
*Assistant Examiner*—Robert Pezzuto

[57] ABSTRACT

A multi-purpose landscaping device is provided including a horizontal rake assembly with a plurality of tines coupled thereto and depending therefrom. A bracket assembly is coupled to the horizontal rake assembly such that a three point hitch of a tractor may be coupled thereto for selectively elevating the rake assembly. An adjustable blade mechanism is provided with a blade having a length equal to that of the rake assembly. The adjustable blade mechanism further includes a blade hydraulic cylinder adapted to raise and lower the blade with respect to the rake assembly. An adjustable roller mechanism with a similar associated hydraulic cylinder is further provided.

6 Claims, 2 Drawing Sheets

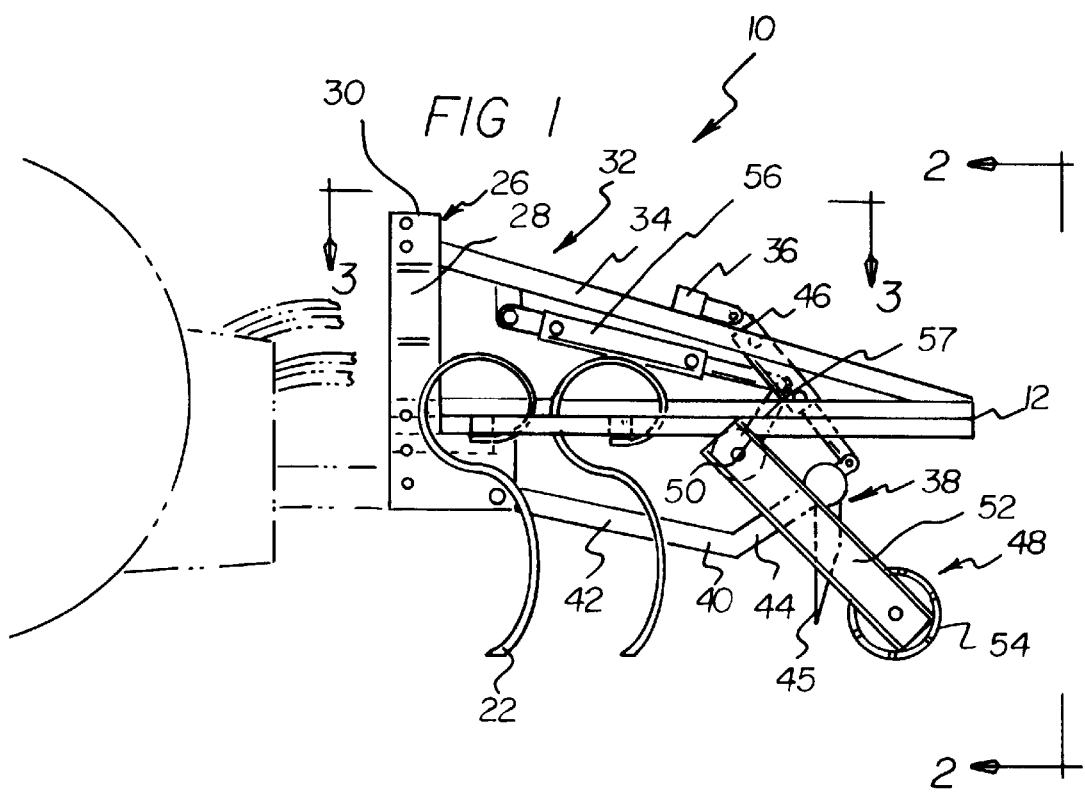
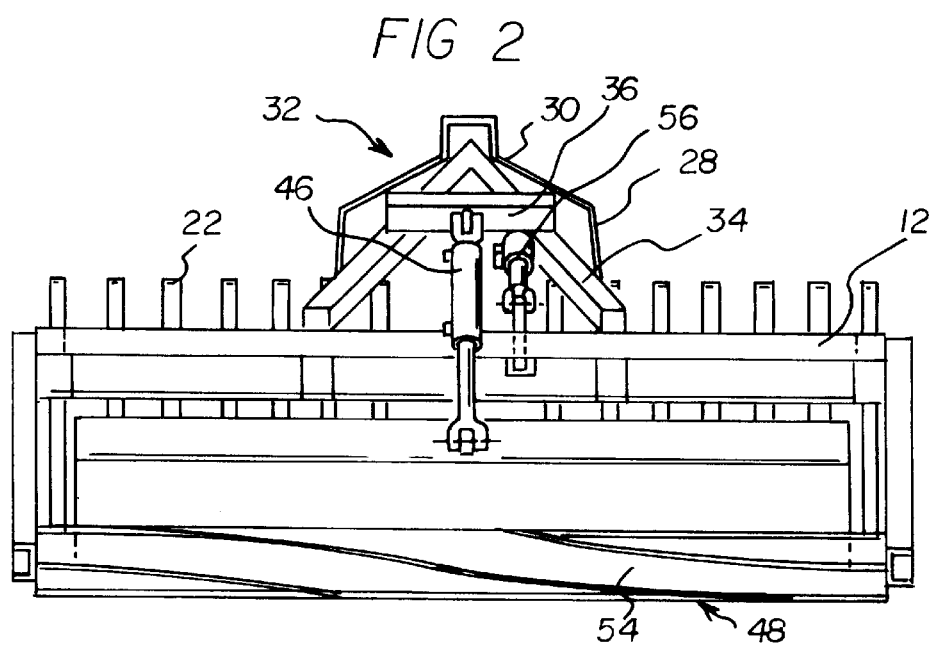

LANDSCAPING RAKE-LEVELING DEVICE

BACKGROUND OF THE INVENTION

1. Field of the Invention

The present invention relates to raking devices and more particularly pertains to a new landscaping rake-leveling device for leveling, raking, breaking up clods of earth, or a combination thereof conveniently from a driver seat of a tractor.

2. Description of the Prior Art

The use of raking devices is known in the prior art. More specifically, raking devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art raking devices include U.S. Pat. No. 5,377,482; U.S. Pat. No. 4,703,612; U.S. Pat. No. 4,516,639; U.S. Pat. No. 4,300,337; U.S. Pat. No. 5,396,756; and U.S. Patent Des. 337,121.

In these respects, the landscaping rake-leveling device according to the present invention substantially departs from the conventional concepts and designs of the prior art, and in so doing provides an apparatus primarily developed for the purpose of leveling, raking, breaking up clods of earth, or a combination thereof conveniently from a driver seat of a tractor.

SUMMARY OF THE INVENTION

In view of the foregoing disadvantages inherent in the known types of raking devices now present in the prior art, the present invention provides a new landscaping rake-leveling device construction wherein the same can be utilized for leveling, raking, breaking up clods of earth, or a combination thereof conveniently from a driver seat of a tractor.

The general purpose of the present invention, which will be described subsequently in greater detail, is to provide a new landscaping rake-leveling device apparatus and method which has many of the advantages of the raking devices mentioned heretofore and many novel features that result in a new landscaping rake-leveling device which is not anticipated, rendered obvious, suggested, or even implied by any of the prior art raking devices, either alone or in any combination thereof.

To attain this, the present invention generally comprises includes a horizontal rake assembly. Such rake assembly includes an inboard bar, an outboard bar, and a pair of side bars coupled therebetween to define a horizontally orientated square, as shown in FIG. 3. The horizontal rake further has an intermediate bar coupled between the side bars adjacent the inboard bar. As shown in FIG. 1, a plurality of S-shaped spring biased tines are spacedly coupled at upper ends thereof along the inboard and intermediate bars and depend therefrom. Such tines are adapted for raking earth during use. Next provided is a vertical bracket assembly including a pair of vertical members. Each of such vertical members has a lower end coupled adjacent to a central extent of the inboard bar of the rake assembly. Upper ends of the vertical members are interconnected by a top member, wherein the vertical members and the top member reside in a vertical plane. As such, a three point hitch of a tractor may be coupled thereto for selectively elevating the rake assembly. Note FIG. 1. Also included is a support assembly with an inverted V-shaped truss. Such truss has an apex coupled to the top member of the vertical bracket assembly and a pair of lower ends coupled to the outboard bar of the rake assembly. As best shown in FIG. 3, a cross bar is coupled across a central extent of the V-shaped truss. For leveling earth, an adjustable blade mechanism is provided. Such mechanism includes a pair of arms pivotally coupled with respect to the inboard bar of the rake assembly. See FIG. 1. The arms extend rearwardly from the tines of the rake assembly and reside beneath the various members thereof. It should be noted that each arm has an elongated inboard linear portion and a short outboard upturned portion. The outboard upturned portion of each arm is fixedly coupled to a top of a blade. The blade resides behind the tines of the rake assembly and has a length equal to that of the rake assembly. Further, the blade has an arcuate cross-section. For maneuvering the blade, the adjustable blade mechanism further includes a blade hydraulic cylinder. The blade hydraulic cylinder is equipped with a first end pivotally coupled to the cross bar of the support assembly and a second end pivotally coupled to the top of the blade. By this design, the blade hydraulic cylinder is adapted to raise and lower the blade with respect to the rake assembly.

For breaking up clods of dirt, an adjustable roller mechanism is provided which includes a shaft rotatably coupled between the side bars of the rake assembly behind the tines thereof. A pair of linear planks each have a first end coupled to a respective end of the shaft and extend rearwardly and downwardly therefrom. A splined roller is rotatably coupled between second ends of the planks. The roller has a length equal to that of the rake assembly. As shown in FIG. 1, the roller further resides behind the adjustable blade mechanism. The adjustable roller mechanism also includes a roller hydraulic cylinder having a first end pivotally coupled to an underside of the V-shaped truss of the support assembly and a second end pivotally coupled to a lever arm. Such lever arm is in turn fixedly coupled to an outer surface of the shaft. As such, the roller hydraulic cylinder is adapted to raise and lower the roller with respect to the rake assembly by rotating the shaft.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new landscaping rake-leveling device apparatus and method which has many of the advantages of the raking devices mentioned heretofore and many novel features that result in a new landscaping rake-leveling device which is not anticipated, rendered obvious, suggested, or even implied by any of the prior art raking devices, either alone or in any combination thereof.

It is another object of the present invention to provide a new landscaping rake-leveling device which may be easily and efficiently manufactured and marketed.

It is a further object of the present invention to provide a new landscaping rake-leveling device which is of a durable and reliable construction.

An even further object of the present invention is to provide a new landscaping rake-leveling device which is susceptible of a low cost of manufacture with regard to both materials and labor, and which accordingly is then susceptible of low prices of sale to the consuming public, thereby making such landscaping rake-leveling device economically available to the buying public.

Still yet another object of the present invention is to provide a new landscaping rake-leveling device which provides in the apparatuses and methods of the prior art some of the advantages thereof, while simultaneously overcoming some of the disadvantages normally associated therewith.

Still another object of the present invention is to provide a new landscaping rake-leveling device for leveling, raking, breaking up clods of earth, or a combination thereof conveniently from a driver seat of a tractor.

Even still another object of the present invention is to provide a new landscaping rake-leveling device that includes a horizontal rake assembly with a plurality of tines coupled thereto and depending therefrom. A bracket assembly is coupled to the horizontal rake assembly such that a three point hitch of a tractor may be coupled thereto for selectively elevating the rake assembly. An adjustable blade mechanism is provided with a blade having a length equal to that of the rake assembly. The adjustable blade mechanism further includes a blade hydraulic cylinder adapted to raise and lower the blade with respect to the rake assembly. An adjustable roller mechanism with a similar associated hydraulic cylinder is further provided.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new landscaping rake-leveling device according to the present invention.

FIG. 2 is a rear view of the present invention.

DESCRIPTION OF THE PREFERRED EMBODIMENT

Figure 3:
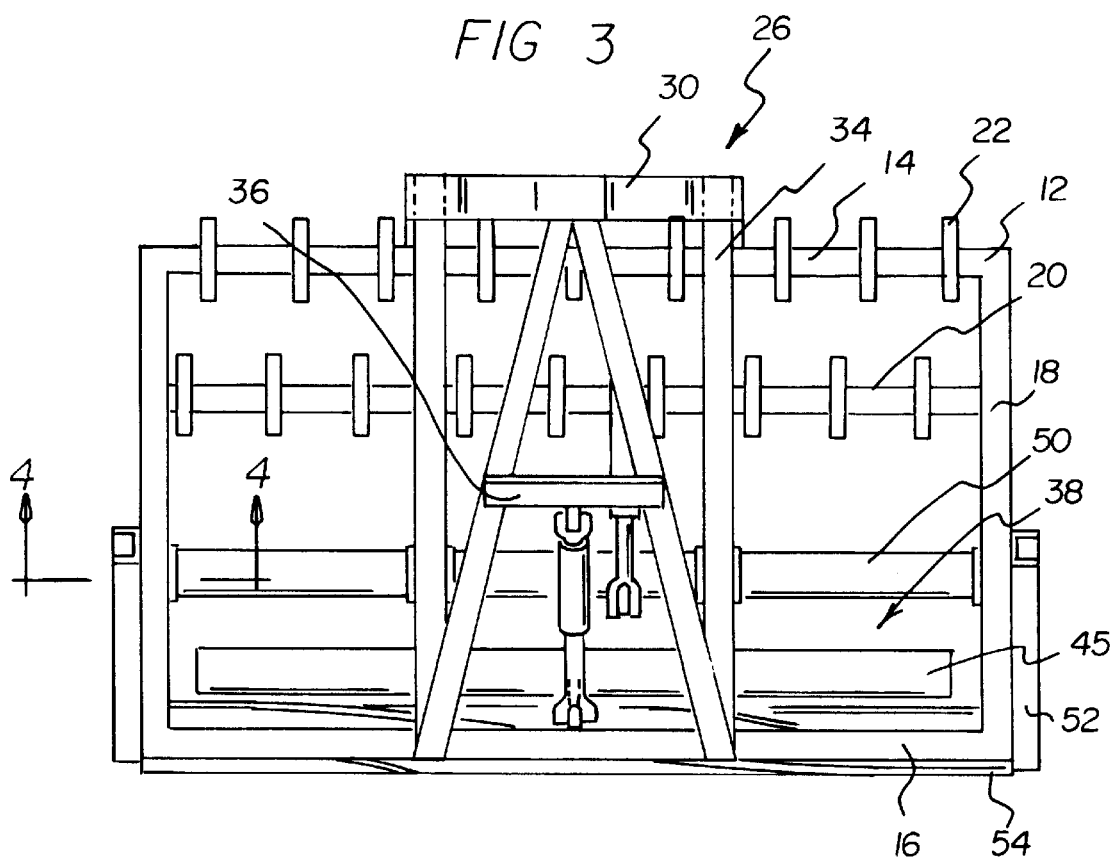
FIG. 3 is a top view of the present invention.

With reference now to the drawings, and in particular to FIGS. 1 through 4 thereof, a new landscaping rake-leveling device embodying the principles and concepts of the present invention and generally designated by the reference numeral 10 will be described.

The system of the present invention designated as numeral 10 includes a horizontal rake assembly 12. Such rake assembly includes an inboard bar 14, an outboard bar 16, and a pair of side bars 18 coupled therebetween to define a horizontally orientated square, as shown in FIG. 3. The horizontal rake further has an intermediate bar 20 coupled between the side bars adjacent the inboard bar. As shown in FIG. 1, a plurality of S-shaped spring biased tines 22 are spacedly coupled at upper ends thereof along the inboard and intermediate bars and depend therefrom. Such tines are adapted for raking earth during use. Lower ends of each tine are angled downwardly and forwardly to facilitate such raking.

Next provided is a vertical bracket assembly 26 including a pair of vertical members 28. Each of such vertical members has a lower end coupled adjacent to a central extent of the inboard bar of the rake assembly. The spacing of the vertical members is preferably less than ⅓ the width of the rake assembly. Upper ends of the vertical members are interconnected by a top member 30, wherein the vertical members and the top member reside in a vertical plane. As such, a three point hitch of a tractor may be coupled to the lower ends of the vertical members and a center of the top member for selectively elevating the rake assembly. Note FIG. 1. Such elevating is preferably conducted from a driver seat of the tractor via one of a plurality of hydraulic controls.

Also included is a support assembly 32 with an inverted V-shaped truss 34. Such truss has an apex coupled to the top member of the vertical bracket assembly and a pair of lower ends coupled to the outboard bar of the rake assembly. As such, the truss is angled rearwardly and downwardly from the top member of the bracket assembly. As best shown in FIG. 3, a cross bar 36 is coupled across a central extent of the V-shaped truss.

For leveling earth, an adjustable blade mechanism 38 is provided. Such mechanism includes a pair of arms 40 pivotally coupled with respect to the inboard bar of the rake assembly. Such coupling is ideally implemented at the lower ends of the vertical members of the bracket assembly. See FIG. 1. The arms extend rearwardly from the tines of the rake assembly and reside beneath the various members thereof. It should be noted that each arm has an elongated inboard linear portion 42 and a short outboard upturned portion 44. The outboard upturned portion of each arm is fixedly coupled to a top of a blade 45. The blade resides behind the tines of the rake assembly and has a length equal to that of the rake assembly. Further, the blade has an arcuate cross-section and a weighted bar coupled thereto.

For maneuvering the blade, the adjustable blade mechanism further includes a blade hydraulic cylinder 46. The blade hydraulic cylinder is equipped with a first end pivotally coupled to the cross bar of the support assembly and a second end pivotally coupled to the top of the blade. By this design, the blade hydraulic cylinder is adapted to raise and lower the blade with respect to the rake assembly.

Figure 4:
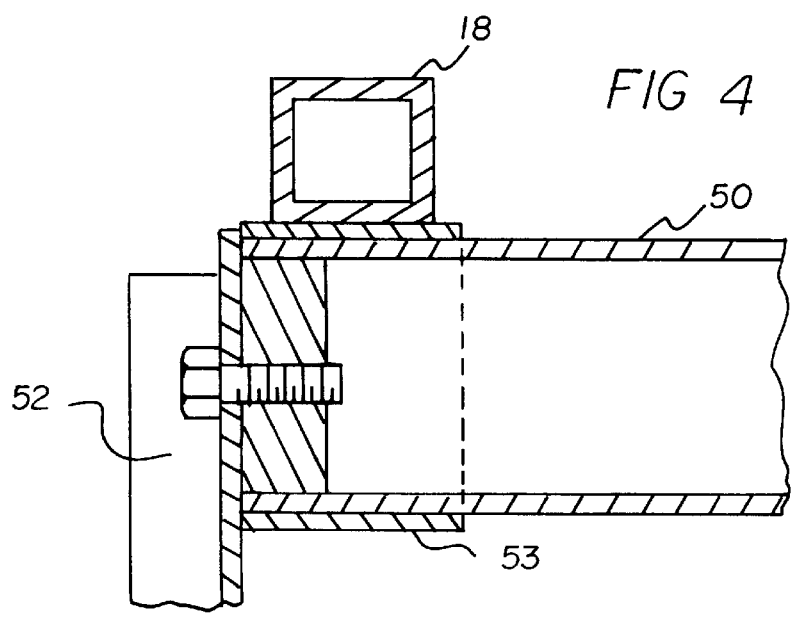
FIG. 4 is a cross-sectional view of the present invention taken along line 4—4 shown in FIG. 3.

For breaking up clods of dirt, an adjustable roller mechanism 48 is provided which includes a shaft 50 rotatably coupled between the side bars of the rake assembly behind the tines thereof. A pair of linear planks 52 each have a first end coupled to a respective end of the shaft and extend rearwardly and downwardly therefrom. The interconnection of the shaft, rake assembly, and planks is shown in FIG. 4. As shown, ends of the shaft are rotatably mounted within sleeves 53 which are in turn connected to the rake assembly.

The adjustable roller mechanism further includes a splined roller 54 rotatably coupled between second ends of the planks. The roller has a length equal to that of the rake assembly. As shown in FIG. 1, the roller further resides behind the adjustable blade mechanism. The adjustable roller mechanism also includes a roller hydraulic cylinder 56 having a first end pivotally coupled to an underside of the V-shaped truss of the support assembly and a second end pivotally coupled to a lever arm 57. Such lever arm is in turn fixedly coupled to an outer surface of the shaft. As such, the roller hydraulic cylinder is adapted to raise and lower the roller with respect to the rake assembly by rotating the shaft. As shown in FIG. 3, the blade and roller hydraulic cylinders are laterally offset so as not to interfere with each other. It should be noted that the roller and blade hydraulic cylinders are both suitably controlled from the tractor in a manner similar to the three point hitch.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A multi-purpose landscaping device comprising, in combination:

a horizontal rake assembly including an inboard bar, an outboard bar, and a pair of side bars coupled therebetween to define a horizontally orientated square, the horizontal rake further including an intermediate bar coupled between the side bars adjacent the inboard bar and a plurality of S-shaped tines spacedly coupled at upper ends thereof along the inboard and intermediate bars and depending therefrom;

a vertical bracket assembly including a pair of vertical members having lower ends coupled to a central extent of the inboard bar of the rake assembly and upper ends interconnected by a top member wherein spacing of the vertical members is preferably less than ⅓ a width of the rake assembly and further wherein the vertical members and the top member reside in a vertical plane such that a three point hitch of a tractor may be coupled thereto for selectively elevating the rake assembly;

a support assembly including an inverted V-shaped truss with an apex fixedly coupled to the top member of the vertical bracket assembly and a pair of lower ends of the V-shaped truss fixedly coupled to the outboard bar of the rake assembly with a cross bar coupled across a central extent of the V-shaped truss;

an adjustable blade mechanism including a pair of arms pivotally coupled at the lower ends of the vertical members of the bracket assembly and extending rearwardly therefrom beneath the rake assembly, each arm having an elongated inboard linear portion and a short outboard upturned portion, the outboard upturned portion of each arm being fixedly coupled to a top of a blade wherein the blade resides behind the tines of the rake assembly, the blade having a length equal to that of the rake assembly and an arcuate cross-section with a weighted bar mounted thereon, the adjustable blade mechanism further including a blade hydraulic cylinder with a first end pivotally coupled to the cross bar of the support assembly and a second end pivotally coupled to the top of the blade, whereby the blade hydraulic cylinder is adapted to raise and lower the blade with respect to the rake assembly; and an adjustable roller mechanism including a shaft rotatably coupled between the side bars of the rake assembly behind the tines thereof, a pair of linear planks each having a first end coupled to a respective end of the shaft and extending rearwardly and downwardly therefrom wherein the ends of the shaft are rotatably mounted within sleeves which are in turn connected to the rake assembly, and a splined roller rotatably coupled between second ends of the planks, the roller having a length equal to that of the rake assembly and residing behind the adjustable blade mechanism, the adjustable roller mechanism further including a roller hydraulic cylinder having a first end pivotally coupled to an underside of the V-shaped truss of the support assembly and a second end pivotally coupled to a lever arm which in turn is fixedly coupled to an outer surface of the shaft, whereby the roller hydraulic cylinder is adapted to raise and lower the roller with respect to the rake assembly by rotating the shaft, wherein the blade and roller hydraulic cylinders are offset and wherein the blade mechanism and the roller mechanism are mounted in parallel relationship beneath an outboard portion of the rake assembly.

2. A multi-purpose landscaping device comprising:

a horizontal rake assembly including an inboard bar, an outboard bar, and a pair of side bars coupled therebetween to define a horizontally orientated square with a plurality of tines coupled thereto and depending therefrom;

a bracket assembly coupled to the horizontal rake assembly such that a three point hitch of a tractor may be coupled thereto for selectively elevating the rake assembly;

an adjustable blade mechanism including a blade having a length equal to that of the rake assembly, the adjustable blade mechanism further including a blade hydraulic cylinder adapted to raise and lower the blade with respect to the rake assembly, an inverted V-shaped truss with an apex fixedly coupled to the vertical bracket assembly and a pair of lower ends of the V-shaped truss fixedly coupled to the rake assembly; and an adjustable roller mechanism including a pair of planks each having a first end rotatably coupled with respect to the rake assembly and a roller rotatable coupled between second ends of the planks, the adjustable roller mechanism adapted to raise and lower the roller with respect to the rake assembly wherein the blade mechanism and the roller mechanism are mounted in parallel relationship beneath an outboard portion of the rake assembly.

3. A multi-purpose landscaping device as set forth in claim 2 and further including an adjustable roller mechanism including a pair of linear planks each having a first end rotatably coupled with respect to the rake assembly and a roller rotatably coupled between second ends of the planks, the adjustable roller mechanism adapted to raise and lower the roller with respect to the rake assembly.

4. A multi-purpose landscaping device as set forth in claim 2 wherein the adjustable blade mechanism includes a pair of arms pivotally coupled with respect to the inboard bar of the rake assembly and extending rearwardly therefrom beneath the rake assembly and further coupled to the blade.

5. A multi-purpose landscaping device as set forth in claim 4 wherein each arm has an elongated inboard linear portion and a short outboard upturned portion.

6. A multi-purpose landscaping device as set forth in claim 4 wherein the blade resides behind the tines of the rake assembly.

\* \* \* \* \*